(12) United States Patent
Quinquis et al.

(10) Patent No.: US 11,638,156 B2
(45) Date of Patent: Apr. 25, 2023

(54) METHOD AND DEVICE FOR ESTABLISHING A SECURE WIRELESS CONNECTION

(71) Applicant: INTERDIGITAL CE PATENT HOLDINGS, Paris (FR)

(72) Inventors: Cyril Quinquis, Cesson-Sevigne (FR); Henk Heijnen, Dinard (FR); Loic Fontaine, Cesson-Sevigne (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 292 days.

(21) Appl. No.: 16/759,184

(22) PCT Filed: Oct. 30, 2018

(86) PCT No.: PCT/EP2018/079628
§ 371 (c)(1),
(2) Date: Apr. 24, 2020

(87) PCT Pub. No.: WO2019/086405
PCT Pub. Date: May 9, 2019

(65) Prior Publication Data
US 2021/0185539 A1 Jun. 17, 2021

(30) Foreign Application Priority Data
Nov. 2, 2017 (EP) ..................... 17306512

(51) Int. Cl.
*H04W 12/50* (2021.01)
*H04W 4/80* (2018.01)
(Continued)

(52) U.S. Cl.
CPC ............. *H04W 12/50* (2021.01); *H04W 4/80* (2018.02); *H04W 12/106* (2021.01); *H04W 76/10* (2018.02); *H04W 84/22* (2013.01)

(58) Field of Classification Search
None
See application file for complete search history.

(56) References Cited

U.S. PATENT DOCUMENTS 8,631,471 B2 1/2014 Dattagupta et al.
9,112,844 B2 8/2015 Story
(Continued)

FOREIGN PATENT DOCUMENTS

CN 105027664 A 11/2015
CN 106716920 A 5/2017

OTHER PUBLICATIONS

Calhoun et al., "Control and Provisioning of Wireless Access Points (CAPWAP) Protocol Specification", Internet Official Protocol Standards, Network Working Group, Request for Comments: 5415, Mar. 2009, 156 pages.
(Continued)

*Primary Examiner* — Eunsook Choi
(74) *Attorney, Agent, or Firm* — Volpe Koenig

(57) ABSTRACT

In a context of virtualized access points deployment, an access point of a first wireless network is split in a radio equipment deployed at the user premises and a radio equipment controller deployed in a data centre located a few kilometres from the user premises, the radio equipment and the radio equipment controller being interconnected via a wired network connection. In order to establish a secure wireless connection of a device to the virtualized access point in a user-friendly manner, a salient idea is to receive at the radio equipment controller in the data centre a first and a second information items respectively emulating a first action of a user on the first device and a second action of the user on the virtualized access point. The disclosed principles are advantageous as sending the first and the second information items to the radio equipment controller allows to emulate user actions on both the wireless device seeking for
(Continued)

joining the first wireless network and the virtualized access point, further allowing to use simple but secure wireless configuration setup protocols, avoiding laborious configurations from users.

14 Claims, 6 Drawing Sheets

(51) Int. Cl.
  *H04W 12/106* (2021.01)
  *H04W 76/10* (2018.01)
  *H04W 84/22* (2009.01)

(56) References Cited

U.S. PATENT DOCUMENTS

| | | | |
|---|---|---|---|
| 9,241,367 | B2 | 1/2016 | Chen et al. |
| 9,531,578 | B2 | 12/2016 | Gilson et al. |
| 9,730,071 | B1* | 8/2017 | Guo ................... H04W 12/06 |
| 10,178,182 | B2* | 1/2019 | Bunker ................ H04L 63/08 |
| 10,891,959 | B1* | 1/2021 | Moeller ............... H04L 67/52 |
| 2002/0061748 | A1 | 5/2002 | Nakakita et al. |
| 2014/0240089 | A1* | 8/2014 | Chang ............. G06Q 30/0207 340/5.61 |
| 2015/0223068 | A1 | 8/2015 | Thelen et al. |
| 2016/0066353 | A1* | 3/2016 | Kumar ................ H04W 12/50 709/227 |
| 2016/0212194 | A1* | 7/2016 | Palin ..................... H04W 4/80 |
| 2016/0330077 | A1 | 11/2016 | Jin et al. |
| 2017/0347264 | A1* | 11/2017 | Holland ................ H04L 9/3242 |
| 2017/0372600 | A1* | 12/2017 | Palin ..................... H04W 4/80 |
| 2020/0344824 | A1* | 10/2020 | Kennedy ............... H04L 67/12 |

OTHER PUBLICATIONS

Anonymous, "Common Public Radio Interface (CPRI); Interface Specification", CPRI Specification V7.0, Oct. 9, 2015, 128 pages.
Anonymous, "An 610: Implementing Deterministic Latency for CPRI and OBSAI Protocols in Altera Devices", Altera Corporation, Application Note AN-610-1.0, Jul. 2010, 18 pages.
Khadraoui et al., "Virtual residential gateways: Architecture and performance", 23rd European Conference on Networks and Communications (EUCNC'14), Bologna, Italy, Jun. 23, 2014, 7 pages.

* cited by examiner

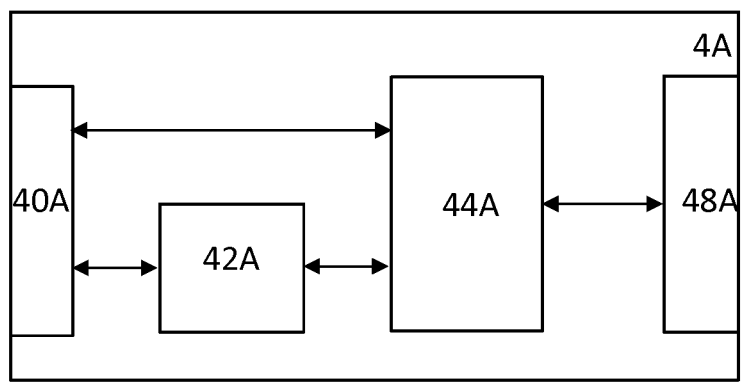
Figure 4A (REC)
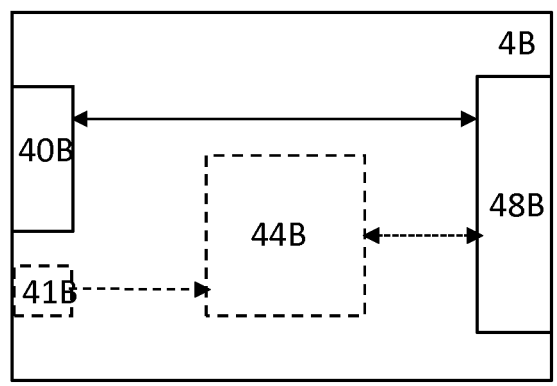
Figure 4B (RE)
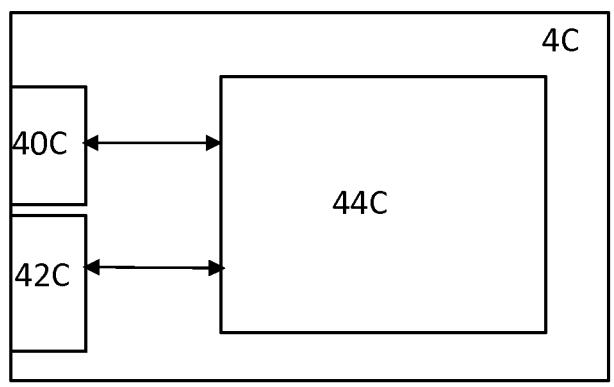
Figure 4C (D1)

METHOD AND DEVICE FOR ESTABLISHING A SECURE WIRELESS CONNECTION

This application claims the benefit, under 35 U.S.C. § 371 of International Application PCT/EP2018/079628, filed Oct. 30, 2018, which was published in accordance with PCT Article 21(2) on May 9, 2019, in English, and which claims the benefit of European Patent Application No. 17306512.9, filed Nov. 2, 2017.

1. TECHNICAL FIELD

The present disclosure relates to the domain of wireless networks and the setup of secure wireless connections.

2. BACKGROUND ART

Security configuration for wireless networks is known to be challenging as it requires users to enter very long keys on various wireless devices. Some techniques are known to simplify the security configuration, but require physical interactions on various devices. In Bluetooth for example devices can be easily paired using the Secure Simple Pairing (SSP) of Bluetooth. In its simplest form it requires basic physical interaction (via for example a device menu or buttons) with each device to be paired. If protection against man in the middle attacks is also expected, users are further requested to generate passkeys also via local physical interaction with each device. In another example, the Wi-Fi Protected Setup (WPS) has been defined by the Wi-Fi Alliance to simplify the configuration of the wireless network while still providing users with the assurance that their wireless networks are protected against unauthorized access and disclosure of private information. In WPS, a popular option is the push button option where a button is to be pushed both at the access point and at the wireless device to setup the configuration.

With the increase of the transmission bit rate on optical fibres it is now possible to transmit radio base band signals over long distances, which allows deploying new network topologies where wireless access points such as Wi-Fi access points can be virtualized in a data centre. Easy wireless network configuration however remains very challenging in such new topologies. Some new solutions are needed to simplify establishing a secure wireless network involving a virtualized access point.

3. SUMMARY

In a context of virtualized access points deployment, an access point of a first wireless network is split in a radio equipment deployed at the user premises and a radio equipment controller deployed in a data centre located a few kilometres from the user premises, the radio equipment and the radio equipment controller being interconnected via a wired network connection. In order to establish a secure wireless connection of a device to the virtualized access point in a user-friendly manner, a salient idea is to receive at the radio equipment controller in the data centre a first and a second information items respectively emulating a first action of a user on the first device and a second action of the user on the virtualized access point. The first information item is received from the first device seeking for joining the first wireless network through the radio equipment, and encapsulated in the wired network connection. The second information item is received from a second device to emulate the second action of the user on the virtualized access point. The secure wireless connection is established if the first and second information items are received in a time interval shorter than a value.

The disclosed principles are advantageous as sending the first and the second information items to the radio equipment controller allows to emulate user actions on both the wireless device seeking for joining the first wireless network and the virtualized access point, further allowing to use simple but secure wireless configuration setup protocols, avoiding laborious configurations from users.

To that end a method for establishing a secure wireless connection of a first device to an access point according to a wireless protocol is disclosed, wherein establishing a secure wireless connection is based on physical interactions with both the first device and the access point. The access point is a virtualized wireless access point that comprises a radio equipment connected to a radio equipment controller through a wired network connection wherein the digital baseband functions of the wireless protocol are located in the radio equipment controller and the analog radio frequency functions of the wireless protocol are located in the radio equipment. The method comprises in the radio equipment controller:

receiving a first information item from the first device seeking to connect to the access point through the radio equipment, the first information item being encapsulated in the wired network connection;

receiving a second information item from a second device, the second information item emulating a user action on the access point;

establishing the secure wireless connection of the first device based on the received first and second information items, the first and second information items being received in a time interval shorter than a value.

According to a particularly advantageous variant, the first and the second information items are respectively received from the first and the second devices via respectively a first and a second wireless networks, the second wireless network being different from the first wireless network.

According to another particularly advantageous variant, the first and the second devices are a same device.

According to another particularly advantageous variant, the second information item is associated with the radio equipment.

According to another particularly advantageous variant, the second device is the radio equipment, the second information item being encapsulated in the wired network connection.

According to another particularly advantageous variant, the wired network connection is a Common Public Radio Interface.

According to another particularly advantageous variant, the second information item is encapsulated in one of either a slow C&M channel or a fast C&M channel of the CPRI interface.

According to another particularly advantageous variant, the wired network connection is one of a Reference Point 1 or a Reference point 3 of the Open Base Station Architecture Initiative.

According to another particularly advantageous variant, establishing the secure wireless connection comprises applying a security protocol belonging to a set at least comprising a Wi-Fi protected setup protocol and a Bluetooth Secure Simple Pairing protocol.

In a second aspect, a wireless device is also disclosed. The wireless device comprises:
a first wireless network interface;
a second wireless network interface different from the first wireless interface;
a processor configured to:
send a first information item on the first wireless network interface to connect to an access point according to a wireless protocol;
receive a confirmation on the first wireless interface from the access point in response to sending the first information item;
send a second information item on the second wireless interface, the second information item being associated with the access point and emulating a user action on the access point;
establish a secure wireless connection with the access point in case a positive confirmation is received from the access point in response to periodically sending the first information item, wherein the access point is a virtualized access point comprising a radio equipment connected to a radio equipment controller through a wired network connection, the digital baseband functions of the wireless protocol being located in the radio equipment controller and the analog radio frequency functions of the wireless protocol being located in the radio equipment, and wherein the positive confirmation is generated by the radio equipment controller if the first and second information items were received by the radio equipment controller in a time interval shorter than a value.

In a third aspect, a radio equipment controller device for establishing a secure wireless connection of a first device with an access point according to a wireless protocol, wherein establishing the secure wireless connection is based on physical interactions with both the first device and the access point, is also disclosed. The radio equipment controller device comprises:
means for processing the digital baseband functions of the wireless protocol without relying on an external device for other baseband functions of the wireless protocol;
a wired network interface providing a wired network connection to a radio equipment performing the analog radio frequency functions of the wireless protocol;
means for receiving a first information item from the first device seeking to connect to the access point through the radio equipment, the first information item being encapsulated in the wired network connection
means for receiving a second information item from a second device the second information item emulating a user action on the access point;
means for establishing the secure wireless connection of the first device with the access point based on the received first and second information items, the secure wireless connection being established if the first and second information items are received in a time interval shorter than a value.

In a fourth aspect, a radio equipment controller device for establishing a secure wireless connection of a first device with an access point according to a wireless protocol, wherein establishing the secure wireless connection is based on physical interactions with both the first device and the access point, is also disclosed. The radio equipment controller device comprises:
a digital baseband circuit configured to process the digital baseband functions of the wireless protocol without relying on an external device for other baseband functions of the wireless protocol;
a wired network interface providing a wired network connection to a radio equipment performing the analog radio frequency functions of the wireless protocol;
a processor configured to
receive a first information item from the first device seeking to connect to the access point through the radio equipment, the first information item being encapsulated in the wired network connection
receive a second information item from a second device, the second information item emulating a user action on the access poin;
establish the secure wireless connection of the first device with the access point based on the received first and second information items, the secure wireless connection being established if the first and second information items are received in a time interval shorter than a value.

In a fifth aspect, a radio equipment device for establishing a secure wireless connection with a first device is also disclosed. The radio equipment device comprises:
a RF front end configured to perform the analog radio frequency functions of the wireless protocol and to generate a first sampled baseband signal from a first RF signal received by an antenna;
a wired network interface providing a wired network connection to a radio equipment controller device, the wired network interface being configured to transmit the first sampled baseband signal to the radio equipment controller device, the wired network interface being further configured to receive a second sampled baseband signal from the radio equipment controller device;
the RF front end being further configured to transmit through the antenna a second RF signal corresponding to the received second sampled baseband signal.
means for detecting a signal;
means for transmitting an information item on the second wired network interface in addition to the first sampled baseband signal, in case the signal is detected.

In a sixth aspect, a virtualized access point for establishing a secure wireless connection with a first device is also disclosed. The virtualized access point comprises a radio equipment controller device according to any preceding variant connected to a radio equipment device through a wired network connection, wherein the radio equipment device comprises:
a RF front end configured to perform the analog radio frequency functions of the wireless protocol and to generate a first sampled baseband signal from a first RF signal received by an antenna;
a wired network interface configured to transmit the first sampled baseband signal to the radio equipment controller device, the wired network interface being further configured to receive a second sampled baseband signal from the radio equipment controller device;
the RF front end being further configured to transmit through the antenna a second RF signal corresponding to the received second sampled baseband signal.

According to a particularly advantageous variant, wherein the radio equipment device (4B) further comprises:
means (41B) for detecting a signal responsive to the user action;
means (44B) for transmitting an information item on the second wired network interface in addition to the first sampled baseband signal, in case the signal is detected, the information item emulating the user action on the access point.

In a seventh aspect, a computer program product for establishing a secure wireless connection of a first device to a virtualized access point is also disclosed. The virtualized access point comprises a radio equipment connected to a radio equipment controller through a wired network connection. The computer program product comprises program code instructions executable by a processor for performing the method implemented in any of its variants.

In an eighth aspect, a non-transitory computer-readable storage medium storing computer-executable program instructions for establishing a secure wireless connection of a first device to a virtualized access point is also disclosed. The virtualized access point comprises a radio equipment connected to a radio equipment controller through a wired network connection. is also disclosed. The computer-readable storage medium comprises instructions of program code executable by at least one processor to perform the method implemented in any of its variants.

While not explicitly described, the present embodiments may be employed in any combination or sub-combination. For example, the present principles are not limited to the described variants, and any arrangement of variants and embodiments can be used. Moreover, the present principles are not limited to the described secure wireless configuration setup protocols examples and any other type of secure configuration setup protocol is compatible with the disclosed principles. The present principles are not further limited to the described high bit rate wired network interfaces and are applicable to any other high bit rate wired network interfaces able to carry baseand radio signals.

Besides, any characteristic, variant or embodiment described for a method is compatible with a device comprising means for processing the disclosed method, with a device comprising a processor configured to process the disclosed method, with a computer program product comprising program code instructions and with a non-transitory computer-readable storage medium storing program instructions.

4. BRIEF DESCRIPTION OF THE DRAWINGS

Figure 3A:
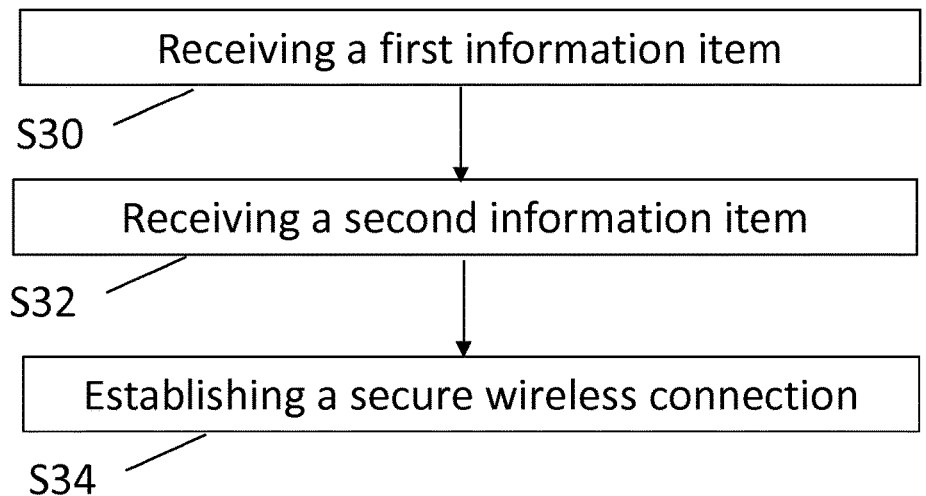
FIG. 3A illustrates a method for establishing a secure wireless connection of a first device to a virtualized wireless access point according to a specific and non-limiting embodiment of the disclosed principles.
Figure 3B:
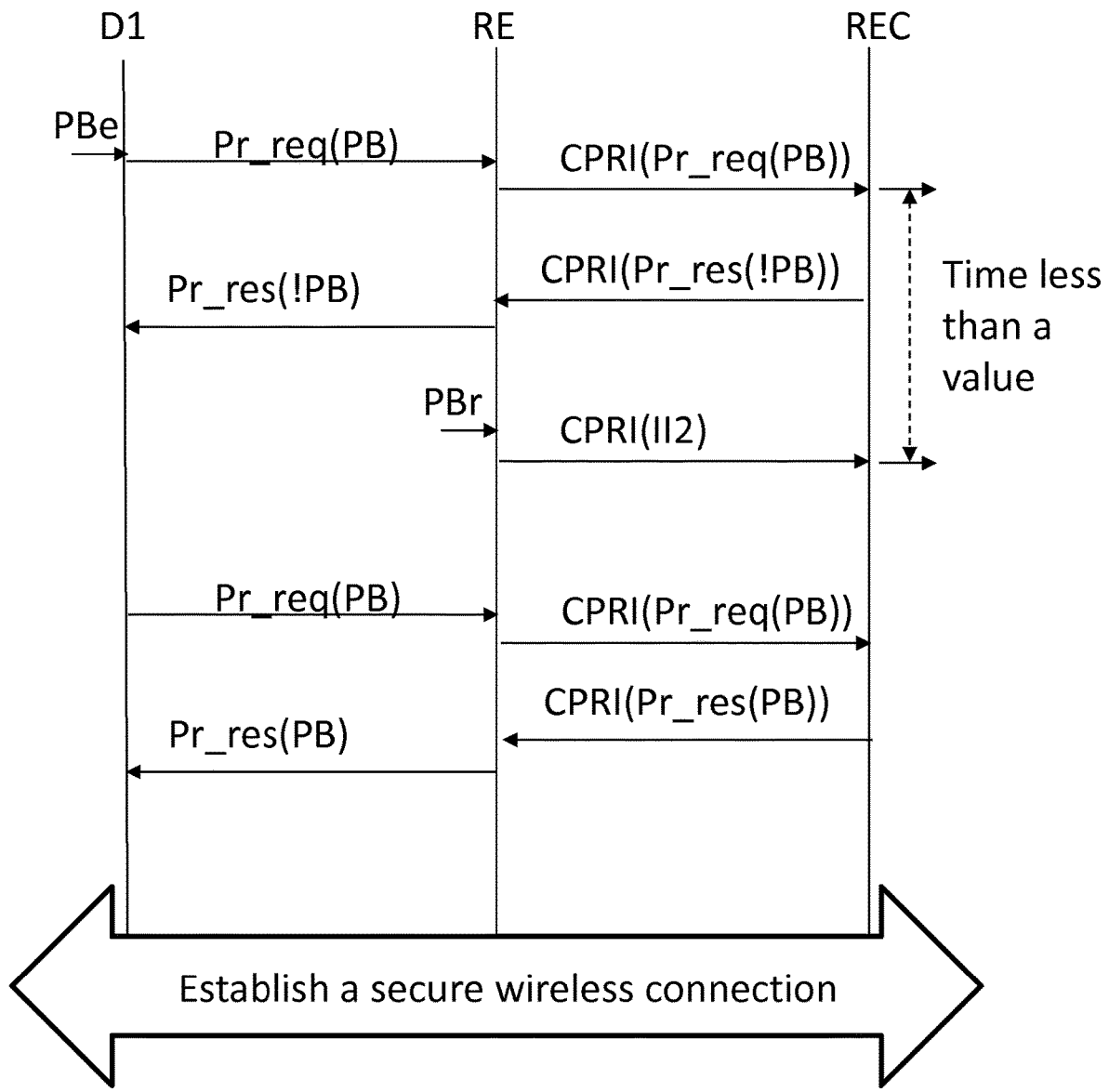
Figure 3C:
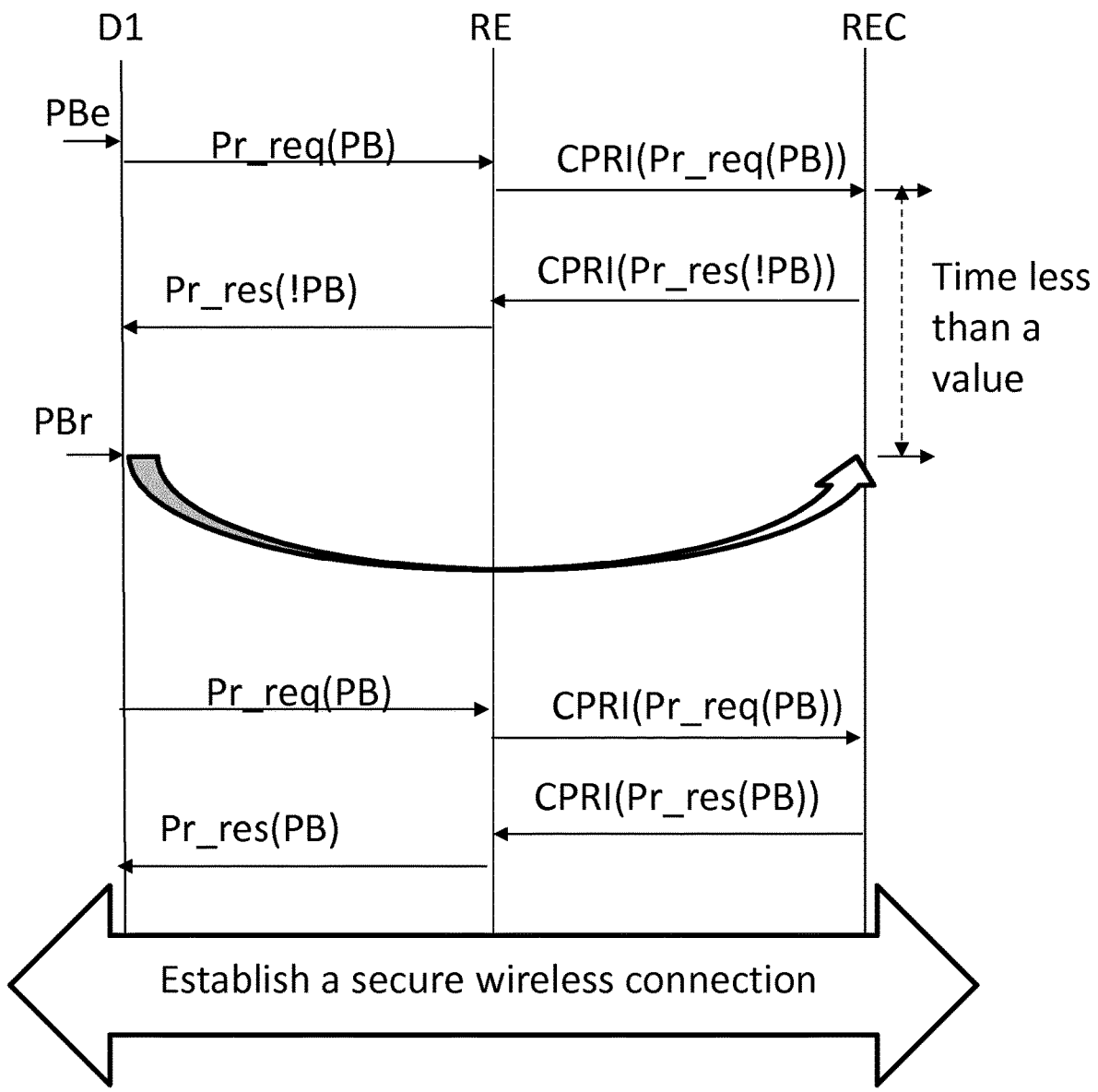
Figure 4D:
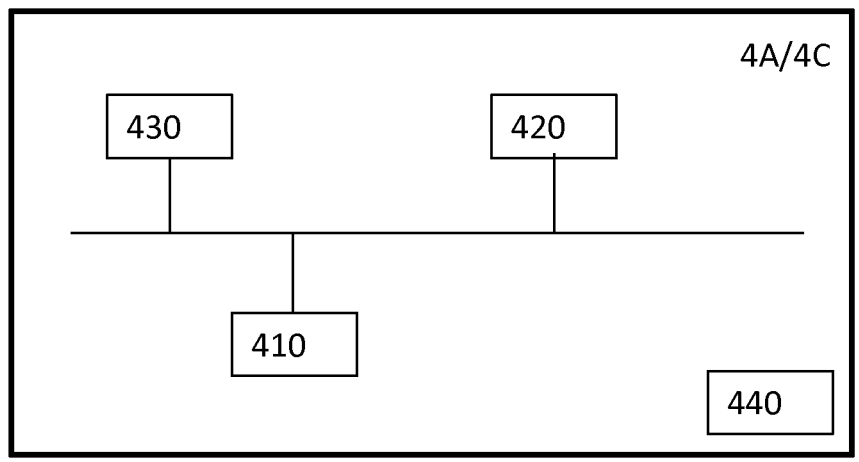

FIGS. 3B and 3C describe protocol exchanges according to two specific and non-limiting embodiments of the disclosed principles FIGS. 4A, 4B and 4C illustrate three processing devices for establishing a secure wireless connection of a first device to a virtualized wireless access point according to three specific and non-limiting embodiments of the disclosed principles;

FIG. 4D represents an exemplary architecture of the processing device of FIGS. 4A and 4C according to a specific and non-limiting embodiment.

It should be understood that the drawing(s) are for purposes of illustrating the concepts of the disclosure and are not necessarily the only possible configuration for illustrating the disclosure.

5. DESCRIPTION OF EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure addresses issues related to establishing a secure wireless connection of a first device to a virtualized access point.

By secure wireless connection, it is meant here and throughout the document wireless data transfer between two devices according to a wireless network protocol, wherein the wireless data transfer is protected against unauthorized access and disclosure of private information. One of the two devices may be a wireless access point. The wireless network protocol is for example and without limitation, compatible with the Wi-Fi standard or the Bluetooth standard in any of their options.

Figure 1:
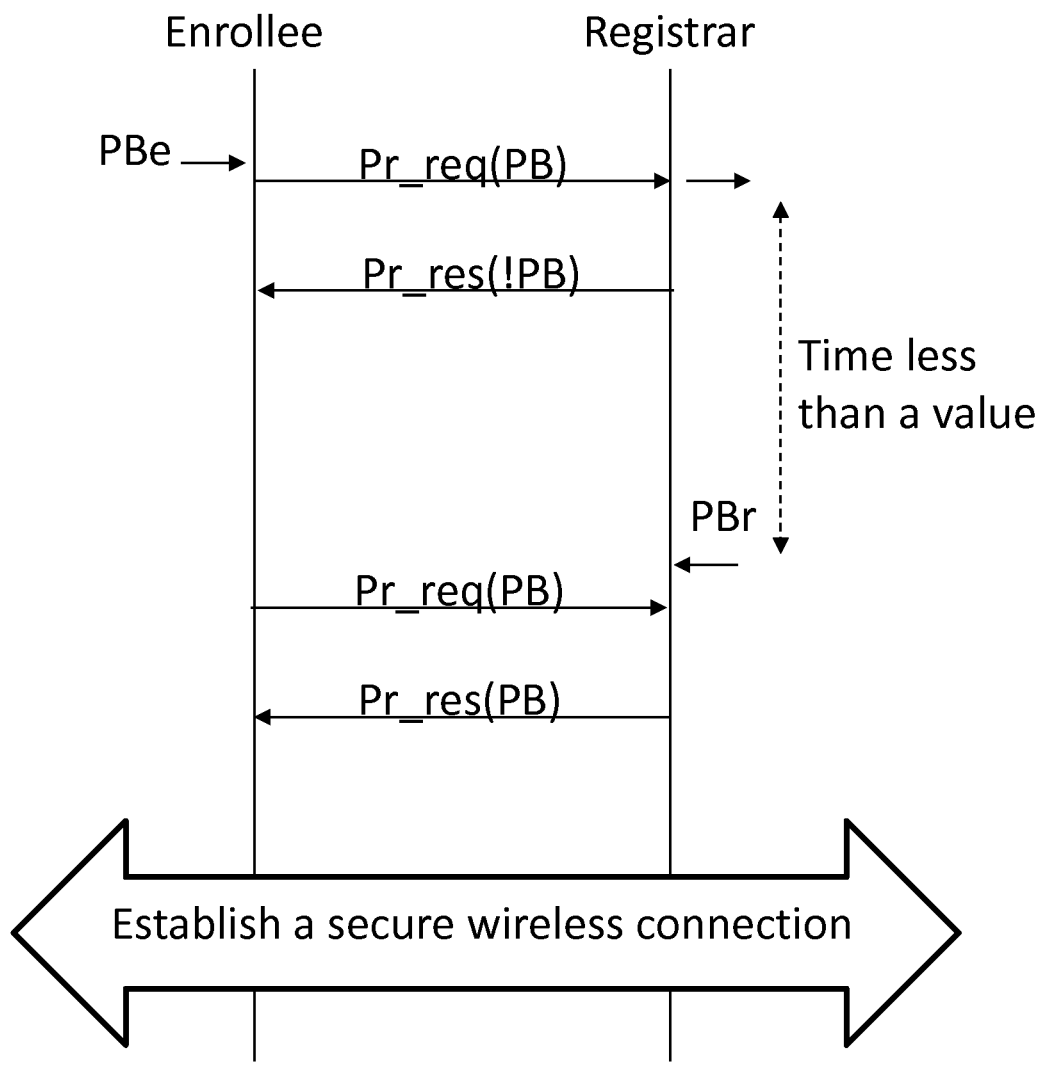
FIG. 1 illustrates the Wi-Fi Protected Setup protocol in the push button option according to the prior art.

By "establishing" a secure wireless connection between two devices, it is meant here and throughout the document triggering a security setup protocol between the two devices to appropriately configure the security of the wireless protocol. According to the disclosed principles, the security setup protocol is based on physical interactions with both devices and comprises a series of exchange security messages between both devices. By "physical interaction" it is meant that a user directly interacts with a device using for example a local user interface. A physical interaction is for example pressing a simple button on an access point, or locally validating on a device (via a keyboard, a front panel or a touch screen) a code displayed by the device. The security setup protocol is for example and without limitation the Wi-Fi Protected Setup (WPS) of the Wi-Fi Alliance as illustrated in FIG. 1, or the Secure Simple Pairing (SSP) of Bluetooth. Any other security setup protocol based on physical interactions with devices to pair, and comprising a series of exchanges of security messages to configure the security of the protocol, is compatible with the disclosed principles.

FIG. 1 illustrates the Wi-Fi Protected Setup protocol in the push button option according to the prior art. In its simplest topology, WPS defines two participants: the registrar and the enrollee. The registrar has the authority to issue and revoke credentials on the network. Typically, but not always, the registrar is the access point. The enrollee, on the other hand, is the device seeking to join the wireless network. The WPS protocol uses IEEE 802.1X and EAP (Extensible Authentication Protocol) on point to point links as defined by IETF RFC 2284 (Internet Engineering Task Force Request For Comment) to transport in-band Registration Protocol messages. WPS comprises a series of EAP message exchanges that are triggered by a user action. Before the authentication is complete only EAP messages are allowed to be transmitted.

Referring to FIG. 1, as a button PBe, corresponding to a user action, is pushed on the enrollee, a wireless probe request message Pr_req(PB), indicating a button has been pushed is sent to the registrar on a regular basis over a given period, typically two minutes. As the registrar receives a wireless probe request message Pr_req(PB) for the first time, the registrar starts a timer (of typically two minutes), waiting for a button to be pushed on the registrar side as well. As long as no push button is detected on the registrar side, the registrar negatively responds to the probe request messages by sending a probe response message comprising a negative flag Pr_res(!PB). When the registrar detects a button PBr is also pushed on his side, before the timer has expired, the registrar positively responds to the next probe request message Pr_req(PB) it receives from the enrollee, by sending a probe response message comprising a positive flag Pr_res (PB). After receiving the positive probe response message Pr_res(PB) from the registrar, the enrollee starts the WPS protocol by sending an EAPOL-Start message (EAPOL meaning Extensible Authentication Protocol Over Lan). At the end of the WPS series of exchanges, the security of the Wi-Fi network is appropriately configured and the Wi-Fi network is secured.

Figure 2:
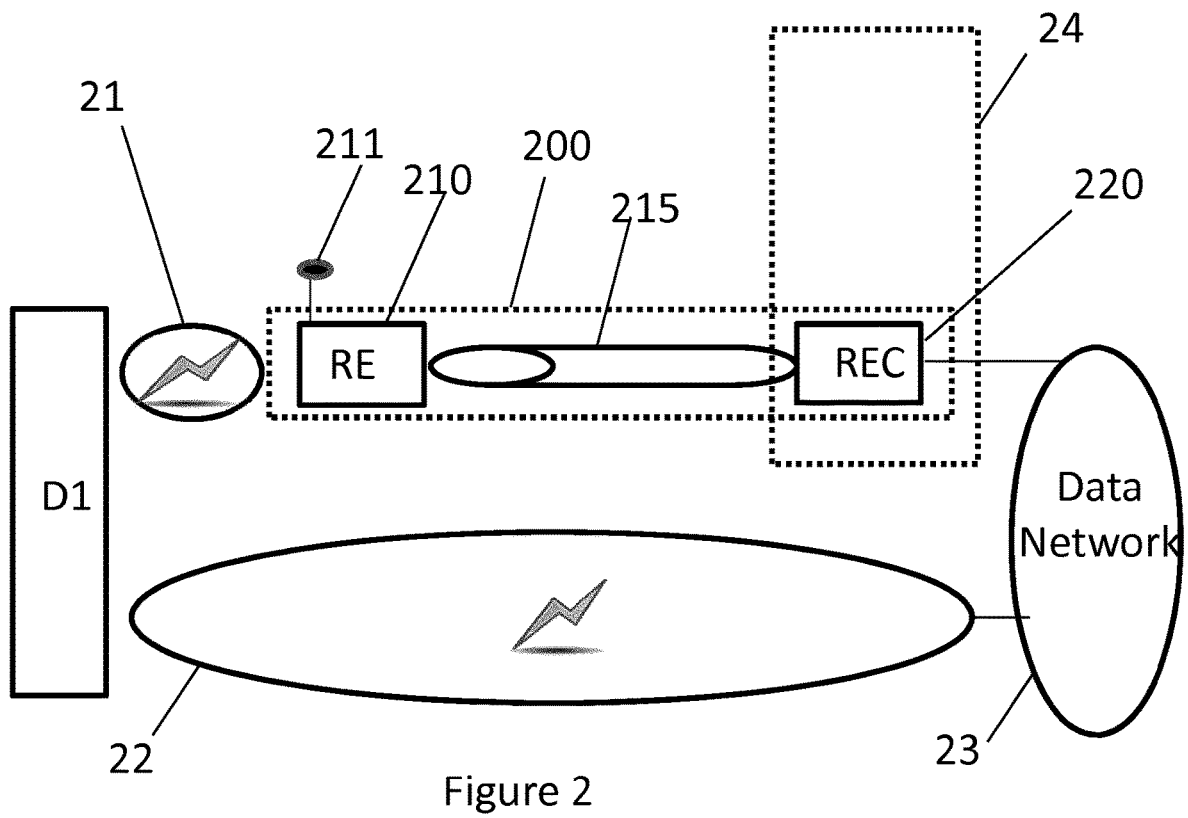
FIG. 2 illustrates a system overview of a virtualized access point according to a specific and non-limiting embodiment.

FIG. 2 illustrates a system overview of a virtualized access point 200 according to a specific and non-limiting embodiment of the disclosed principles. In order to deploy as simple access points as possible in customer premises, an access point is virtualized by splitting the access point in a first part 210 and a second part 220, the first part 210 being close to the antenna 211, located in the customer premises, and being as simple as possible, essentially limited to a RF front end together with basic processing means. According to the disclosed principles, the RF front end performs only the analog radio frequency functions of the wireless protocol, any digital baseband processing of the wireless protocol being performed in the second part 220. The second part 220 of the access point, comprising all the digital processing of the wireless network protocol (including but not limited to the baseband processing), is located in a data centre 24, that can be several kilometres from the first part 210. The second part 220 of the access point performs the digital baseband functions of the wireless protocol without relying on an external device for other baseband functions of the wireless protocol. Both the first 210 and the second 220 parts are coupled by a high bit rate wired connection 215. This is possible thanks to the high bit rate offered by optical fibres allowing the transmission of baseband signals over long distances. For the sake of clarity and without loss of generality, the first part is called the Radio Equipment (RE) and the second part is called the Radio Equipment Controller (REC). The virtualized access point 200 comprises the RE 210 and the REC 220, being interconnected via a high bit rate wired connection 215. The general operation of the RE and the REC is as follow: in the downlink the REC generates symbols from the digital baseband signal comprising an in-phase (I) and a quadrature (Q) components. The signal is sampled and transmitted over the wired connection to the RE which is in charge of frequency shifting. In the uplink a digital baseband signal is received from the antenna of the RE, demodulated, sampled and transmitted by RE to the REC over the high bit rate wired network connection, the REC being in charge of the further baseband processing of the wireless network signal.

In a first variant the high bit rate wired network connection is a Common Public Radio interface (CPRI). CPRI is an industry cooperation which defines specifications for interfaces between a RE and a REC for implementing distributed base stations. In a second variant, the high bit rate wired connection is an interface of the Open Base Station Initiative (OBSAI). The OBSAI specifications provide the architecture, function descriptions, interfaces and minimum requirements for integration of a set of common modules into a base station. Internal interfaces between the functional blocks are called reference points (RP). OBSAI RP1 is the interface that allows communication between the control block and the other blocks (RF block, Baseband block and Transport block). OBSAI RP1 includes control and clock signals. RP3 is the interface between baseband block and RF block. According to the second variant, the wired network interface is a RP1 or a RP2 interface of OBSAI. More generally, any high bit rate wired interface allowing to transport sampled baseband radio signals between a RF front end and a baseband processing unit over a few kilometres is compatible with the disclosed principles.

The virtualized access point 200 allows a first device D1 to connect to a data network 23 via a first wireless network 21. The virtualized access point 200 allows to virtualize the access to the first wireless network 21 in the data centre 24, being interconnected with the data network 23. The data network 23 is for example and without limitation the Internet network, or the Evolved Packet Network (EPC) of the LTE (Long Term Evolution) network architecture. The first wireless network is for example and without limitation a wireless local area network such as a Wi-Fi network in any of its options, or a Bluetooth network in any of its variants. Any kind of wireless network technology is compatible with the disclosed principles.

The first device D1 is typically a communication device such as for example and without limitation a smartphone, a tablet, or more generally any communication device with a wireless local area network interface. The first device D1 is further connected to the data network 23 via a second wireless network 22 such as for example and without limitation a cellular network (3G, 4G or 5G type of network). Any wireless network is compatible with the disclosed principles. Advantageously, the second wireless network 22 is different from the first wireless network 21. In a first variant the first and the second wireless networks use a same wireless technology (for example the Wi-Fi technology). In a second variant, the first and the second wireless networks use two different wireless technologies, such as for example Wi-Fi and 3G/4G/5G cellular technologies.

FIG. 3A illustrates a method for establishing a secure wireless connection of a first device D1 to a virtualized wireless access point 200 according to a specific and non-limiting embodiment of the disclosed principles. As previously described, the virtualized wireless access point 200 comprises a RE 210 connected to a REC 220 through a wired network connection 215. FIG. 3A is described together with FIGS. 3B and 3C describing protocol exchanges according to two specific and non-limiting embodiments of the disclosed principles. For the sake of clarity and without loss of generality, the method is described assuming the first wireless network is a Wi-Fi network, the security setup protocol is WPS, and the wired network connection is a CPRI interface, but any other wireless network, any other security setup protocol, and any other high bit rate wired network connection are compatible with the disclosed principles.

In the step S30, a first information item is received by the virtualized access point 200 from the first device D1. Referring to FIGS. 3B and 3C the first information item is representative of a button PBe being pushed on the first device D1 seeking to join the first wireless network 21 in a secured mode. The device D1 attempts to setup the security configuration of the first wireless network 21 for further accessing the data network 23. The push button may be a physical push able button on the first device D1, or a logical button being logically pushed as part of an application executing on the first device D1. In a non-limiting example, the first device D1 comprises a wireless configuration application, which once being launched, and as part of its initialization considers a logical button has being pushed for triggering WPS. After the button PBe has been pushed on the first device D1, the first device sends a WPS probe request message Pr_req(PB) to the registrar to indicate that a button has been pushed on the enrollee. The RE receives, demodulates and samples the wireless signal comprising the Pr_req (PB) message, for transmitting it over the CPRI interface, the first information item being encapsulated in at least one control block of the CPRI interface, noted CPRI(Pr_req (PB)) in the FIGS. 3B and 3C. A control block of the CPRI interface comprises 256 control words (of 8 bits or more) and represents the frame structure of the CPRI physical layer. The REC receiving the CPRI data comprising the probe request message CPRI(Pr_req(PB)), performs the baseband processing for extracting the first information item indicating a button has been pushed on the first device. The REC starts a timer as part of the WPS protocol for monitoring the interval between two subsequent pushed buttons. As long as no other push button is detected, the REC negatively responds to the WPS probe request by encapsulating a probe response message comprising a negative flag into a CPRI control block CPRI(Pr_res(!PB)) and transmitting the CPRI(Pr_res(!PB)) to the RE via the CPRI interface. The RE, receiving the CPRI(Pr_res(!PB)) data, transmits through the antenna a RF signal corresponding to the received CPRI(Pr_res(!PB)) data, the RF signal comprising a WPS negative probe response message Pr_res(!PB). Although not explicitly depicted in FIGS. 3B, 3C, D1 periodically sends probe request messages on the first wireless network, and the REC periodically negatively responds with by transmitting CPRI(Pr_res(!PB)) messages over the CPRI interface.

In the step S32, a second information item is received by the REC from a second device, the second information item emulating a user action on the access point resulting in a push button event on the registrar.

Physical Button embodiment (FIG. 3B)

According to a first and non-limiting embodiment of the disclosed principles, called physical button embodiment, and illustrated at FIG. 3B, the RE further comprises a push button coupled to the basic processing means of the RE. According to the physical button embodiment the second device sending the second information item is the RE device. Pushing the push button on the RE triggers the generation by the RE of an information item (called second information item) indicative of a button being pushed at the RE. The second information item comprises an indication that a button has been pushed at the RE. The indication may be as simple as a single bit set, or it may be a value of a larger size. The second information item further comprises an identifier associated with the virtualized access point 200, by for example identifying the RE device among other RE devices connected to the REC via a plurality of CPRI interfaces. The identifier is for example a serial number uniquely identifying the RE device. Any other kind of identifier allowing to identify a RE device among a set of RE devices is compatible with the disclosed principles.

CPRI supports exchange of Control and Management (C&M) data between the RE and the REC. CPRI supports two different types of C&M channels: a slow C&M channel based on HDLC and a fast C&M channel based on Ethernet, wherein HDLC and/or Ethernet are encapsulated in CPRI control blocks of CPRI control words. Advantageously, the second information item is encapsulated in one of either a slow C&M channel or a fast C&M channel of the CPRI interface before being transmitted by the RE to the REC. The encapsulated second information item is noted CPRI(II2) on the FIG. 3B. The REC, receiving the second information item indicating a button has been pushed on the RE emulates a pushed button on the registrar allowing the REC to perform the rest of the WPS protocol as if the button would have been locally pushed in the registrar running in the data centre. Sending a C&M message over CPRI indicating a push button has been detected by the RE is advantageous as it allows a virtualized access point to establish a secure wireless connection without laborious configuration from a user.

Logical Button Embodiment (FIG. 3C)

According to a second and non-limiting embodiment of the disclosed principles, called logical button embodiment, and illustrated at FIG. 3C, the second information item, emulating a user action on the access point is received by the REC from a second wireless network 22 such as for example and without limitation a cellular network (3G, 4G, 5G), interconnected with the data network. In a first variant (represented in FIG. 3C) the second device is the same device as the first device D1, that comprises an interface to the second wireless network 22. In a second variant (not represented) the second device is a different device from the first device D1. The second device may be for example another smartphone device, a tablet or a laptop or any kind of mobile device equipped with an interface to the second wireless network 22. The second information item is sent to the REC to indicate that a second (logical or physical) button PBr has been pushed to complement the first pushed button PBe on the first device D1 for establishing the secure wireless connection of the first device D1. The second information item therefore comprises an indication that a button has been pushed. The indication may be as simple as a single bit set, or it may be a value of a larger size. The second information item further comprises an identifier that is associated with the virtualized access point 200, to which the secure wireless connection of the first device D1 is to be established. For example, the identifier uniquely identifies the RE of the virtualized access point 200. Several variants are possible for a second device to retrieve an identifier associated with the virtualized access point 200. In a first variant the identifier is present on the RE, for example printed on the package of the RE, as a serial number or as a Qr code, the RE being associated with the REC by any means known to the skilled in the art. The second device gets the identifier from the RE, for example by reading the Qr code, or by the user entering the serial number, or by any other means, and transmits the identifier to the REC via the second wireless network. In a second variant, the virtualized access point is operated by a network operator for providing Internet access to a customer premises. As the user subscribes to the service, she provides a cell phone number of the second device and receives the identifier via a SMS from the network operator. In another example, the second device gets the identifier associated with the virtualized access point from a web site operated by the network operator. Receiving by the REC the second information item from the second wireless network allows the REC to perform the rest of the WPS protocol as if a button would have been locally pushed in the registrar running in the data centre. Sending the second information item comprising an identifier associated with the virtualized access point emulates in the REC a detection of a button pushed at the registrar advantageously allowing a virtualized access point to establish a secure wireless connection without laborious configuration from a user. It shall be noted that the second device sending the second information item for securing the connection of the first device on the first wireless network does not need to be connected to the first wireless network.

In the step S34, for both the physical and the logical push button embodiments, the secure wireless connection of the first device D1 is established based on the received first and second information items, the first and second information items being received in a time interval shorter than a value. As mentioned above, and in any of the physical and the logical button embodiments, the second information item comprise an identifier associated with the virtualized access point, allowing to further associate the second information item, received by the REC from the data network with the first information item received by the REC from its connected RE over the CPRI interface. As the REC receives the second information item, if the time elapsed since the reception of the corresponding first information item is less than a value (typically two minutes), the REC positively responds to the next probe request CPRI(Pr_req(PB)) received from the first device on the first wireless network over the CPRI interface, by sending a positive probe response message CPRI(Pr-Res(PB)) over the CPRI interface. The first device D1, after receiving the positive probe response Pr_res(PB) from the virtualized access point, triggers the remaining of the WPS protocol by sending the EAPOL-Start message. The REC by receiving the EAPOL-Start message runs the remaining of the WPS protocol to establish the secure wireless connection of the first device with the virtualized access point.

If the time elapsed between the reception of the first information and the reception of the corresponding second information item by the REC is above the value, the REC will continue to negatively respond to the probe request messages coming from the first device over the CPRI interface, and the REC does not establish the secure wireless connection of the first device.

FIG. 4A illustrates a Radio Equipment Controller (REC) processing device 4A for establishing a secure wireless connection of a first device according to a specific and non-limiting embodiment of the disclosed principles. The processing device 4A comprises a first network interface 40A configured to send and receive sampled baseband radio signals to/from at least one radio equipment device. According to different embodiments of the disclosed principles, the first network interface is a wired network interface belonging to a set comprising:

A CPRI interface;
A OBSAI RP1 interface;
A OBSAI RP3 interface.

More generally, any high bit rate wired interface allowing to transport sampled baseband radio signals between a Radio Equipment and a Radio Equipment Controller over a few kilometres is compatible with the disclosed principles.

According to a specific and non-limiting embodiment, the first network interface 40A is coupled to a baseband processing module 42A configured to perform the baseband processing of the radio signals received/transmitted over the network interface 40A. More precisely, the baseband processing module 42A comprises the necessary hardware resources (digital signal processors, general purpose processors, more dedicated hardware) for performing the processing of the physical and MAC layers of the wireless network corresponding to the received/transmitted radio signals. The baseband processing module is configured to process the digital baseband functions of the wireless protocol without relying on an external device for other baseband functions of the wireless protocol.

According to a specific and non-limiting embodiment the processing device 4A further comprises a second network interface 48A configured to connect to a data network for sending and receiving data from the data network. According to different embodiments of the disclosed principles, the second network interface belongs to a set comprising:

- a WAN (Wide Area Network) interface such a 2G/3G/4G cellular wireless network interface, WiMax interface, xDSL, FFTx;
- a wireless LAN (Local Area Network) interface such as Bluetooth, Wi-Fi in any flavour, or any kind of wireless interface of the IEEE 802 family of network interfaces;
- a wired LAN interface such as Ethernet, IEEE 802.3 or any wired interface of the IEEE 802 family of network interfaces.
- A wired bus interface such as USB, FireWire, or any kind of wired bus technology.

More generally, any network interface allowing to connect to a data network is compatible with the disclosed principles.

According to a specific and non-limiting embodiment the first 40A and second 48A network interfaces and the baseband processing module 42A are further coupled to a processing module 44A configured to receive a first information item from the first device through the radio equipment, the first information item being encapsulated in the wired network connection, received by the first network interface 40A, processed by the baseband processing module 42A. The processing module 44A is further configured to establish the secure wireless connection of the first device with the access point based on the received first and second information items, the secure wireless connection being established if the first and second information items are received in a time interval shorter than a value.

According to a specific and non-limiting embodiment of the disclosed principles, the Radio Equipment Controller processing device is hosted in a data centre that virtualizes a large number of access points.

FIG. 4B illustrates a Radio Equipment device 4B for establishing a secure wireless connection of a first device according to a specific and non-limiting embodiment of the disclosed principles. The RE device 4B comprises a network interface 48B configured to transmit and receive sampled baseband radio signals to/from at least one radio equipment controller device. According to different embodiments of the disclosed principles, the network interface 48B is a wired network interface belonging to a set comprising:

A CPRI interface;
A OBSAI RP1 interface;
A OBSAI RP3 interface.

More generally, any high bit rate wired interface allowing to transport sampled baseband radio signals between a Radio Equipment and a Radio Equipment Controller over a few kilometres is compatible with the disclosed principles.

According to different embodiments of the disclosed principles the RE device 4B further comprises a RF front end 40B, including an antenna (not represented), adapted to transmit and receive RF signals to/from the first device. According to different embodiments of the disclosed principles, the RF front end is adapted to transmit/receive, and perform the analog radio frequency functions of the wireless protocol (including modulate/demodulate RF signals) of wireless network interfaces belonging to a set comprising:

- a Wi-Fi interface according to any option, or more generally any kind of wireless LAN interface of the IEEE 802.11 standard according to any version and/or variant;
- a Bluetooth interface according to any version and/or variant of the Bluetooth standard;

More generally, any wireless network interface applicable to a virtualized access point is compatible with the disclosed principles.

In the uplink direction, the RF front end 40B is configured to generate a first sampled baseband signal from a first RF signal received by the antenna. More precisely, the RF front end is configured to demodulate the first RF signal, therefore generating a first baseband radio signal, comprising an in-phase component and a quadrature component. The RF front end 40B is further configured to sample the first baseband radio signal, resulting in the first sampled baseband signal being transmitted to the REC by the network interface 48B.

In the downlink direction, the network interface 48B is configured to receive a second sampled baseband signal from the REC, and the RF front end 40B is configured to transmit through the antenna a second RF signal corresponding to the received second sampled baseband signal. More precisely, the RF front end 40B is configured to modulate and transmit a second baseband radio signal, wherein its analogue form is retrieved from the second sampled baseband signal received from the network interface 48B.

According to different embodiments of the disclosed principles the RE device 4B further comprises on optional signal detector 41B such as for example and without limitation a push button, or a touch pad. The signal detector is configured to generate a signal when activated (for example by pushing the button, touching the pad) by a user. Any signal detector able to detect a signal from a user is compatible with the disclosed principles. According to different embodiments of the disclosed principles the RE device 4B further comprises on optional basic processing module 44B configured to transmit an information item on the wired network interface in addition to the first sampled baseband signal, in case a signal is detected by the signal detector 41B. By basic processing module, it is meant here a simple microcontroller or a simple micro processing unit, coupled for example with an internal memory (RAM, ROM, EPROM). Indeed, the processing resources of the basic processing module may be very limited. There is no need in the RE for powerful processor architectures, contrary to the REC or to the first device for instance.

FIG. 4C illustrates a processing device 4C of a first device for establishing a secure wireless connection with a virtualized access point according to a specific and non-limiting embodiment of the disclosed principles. The processing device 4C comprises a first wireless network interface 40C configured to transmit and receive data over a first wireless network. According to different embodiments of the disclosed principles, the first wireless network interface belongs to a set comprising:

- a Wi-Fi interface according to any option, or more generally any kind of wireless LAN interface of the IEEE 802.11 standard according to any version and/or variant;
- a Bluetooth interface according to any version and/or variant of the Bluetooth standard.

More generally, any local wireless network interface applicable to a virtualized access point is compatible with the disclosed principles.

According to different embodiments of the disclosed principles the processing device 4C further comprises a second wireless network interface 42C, different from the first wireless network interface 40C, and configured to transmit/receive data over a second wireless network. According to different embodiments of the disclosed principles, the second wireless network interface belongs to a set comprising:
- a Wi-Fi interface according to any option, or more generally any kind of wireless LAN interface of the IEEE 802.11 standard according to any version and/or variant;
- a Bluetooth interface according to any version and/or variant of the Bluetooth standard;
- a wireless interface of the IEEE 802 family of network interfaces;
- a cellular wireless network interface, including but not limited to 2G/3G/4G cellular network interfaces,
- a wireless access interface including but not limited to WiMax interface.

More generally, any wireless network interface for connecting to a data network is compatible with the disclosed principles.

According to different embodiments of the disclosed principles the processing device 4C further comprises a processing module 44C configured to send a first information item on the first wireless network interface to connect to an access point and to receive confirmations on the first wireless interface from the access point in response to sending the first information item. The processing module 44C is further configured to send a second information item on the second wireless interface, the second information item being associated with the access point according to any variant described in the logical button embodiment. The processing module 44C is further configured to establish a secure wireless connection with the access point in case a positive confirmation is received from the access point in response to sending the first information item, wherein the access point is a virtualized access point comprising a radio equipment connected to a radio equipment controller through a wired network connection. The positive confirmation is generated by the radio equipment controller if the first and second information items were received by the radio equipment controller in a time interval shorter than a value.

FIG. 4D represents an exemplary architecture of the processing device 4A, 4C according to a specific and non-limiting embodiment, where the processing device 4A, 4C is configured to establish a secure wireless connection of a first device to a virtualized wireless access point. The processing device 4A, 4C comprises one or more processor(s) 410, which is(are), for example, a CPU, a GPU and/or a DSP (English acronym of Digital Signal Processor), along with internal memory 420 (e.g. RAM, ROM, EPROM). The processing device 4A, 4C comprises one or several Input/Output interface(s) 430 adapted to send to display output information and/or to allow a user to enter commands and/or data (e.g. a keyboard, a mouse, a touchpad, a webcam, a display), and/or to send/receive data over a network interface; and a power source 440 which may be external to the processing device 4A, 4C.

According to an exemplary and non-limiting embodiment, the processing device 4A, 4C further comprises a computer program stored in the memory 420. The computer program comprises instructions which, when executed by the processing device 3, in particular by the processor 410, make the processing device 3 carry out the processing method described with reference to FIG. 3A. According to a variant, the computer program is stored externally to the processing device 4A, 4C on a non-transitory digital data support, e.g. on an external storage medium such as a SD Card, HDD, CD-ROM, DVD, a read-only and/or DVD drive and/or a DVD Read/Write drive, all known in the art. The processing device 4A, 4C thus comprises an interface to read the computer program. Further, the processing device 3 could access one or more Universal Serial Bus (USB)-type storage devices (e.g., "memory sticks.") through corresponding USB ports (not shown).

According to exemplary and non-limiting embodiments, the processing device 4C is a device, which belongs to a set comprising:
- a smartphone;
- a mobile device;
- a game device;
- a tablet (or tablet computer);
- a laptop;
- a see-through display device;
- a head mounted display device;
- a wireless communication device.

According to exemplary and non-limiting embodiments, the processing device 4A is a device, which belongs to a set comprising:
- a laptop computer;
- a desktop computer;
- a server;
- a cloud computing instance.

The invention claimed is:

1. A method implemented in a radio equipment controller of an access point, the method comprising:
  receiving a first information item from a first device through a radio equipment of the access point, the radio equipment being connected to the radio equipment controller through a wired network connection, the first information item being representative of a first user action occurring on the first device seeking to connect to the access point, the first information item being encapsulated in the wired network connection;
  receiving a second information item from a second device, the second information item indicating a second user action complementing the first user action to connect the first device to the access point, wherein the first and the second information items are respectively received from the first and the second devices via respectively a first and a second wireless networks, the second wireless network being different from the first wireless network; and
  establishing a secure wireless connection of the first device to the access point based on the received first and second information items, on condition that the first and second information items were received in a time interval shorter than a value.

2. The method according to claim 1, wherein the first and the second devices are a same device.

3. The method according to claim 1, wherein the second information item is associated with the radio equipment.

4. The method according to claim 1, wherein the wired network connection is a Common Public Radio Interface (CPRI).

5. The method according to claim 1, wherein the wired network connection is one of a Reference Point 1 or a Reference point 3 of the Open Base Station Architecture Initiative.

6. The method according to claim 1, wherein establishing the secure wireless connection comprises applying a security protocol belonging to a set at least comprising a Wi-Fi protected setup protocol and a Bluetooth Secure Simple Pairing protocol.

7. A wireless device comprising:
a first wireless network interface for connection to a first wireless network;
a second wireless network interface for connection to a second wireless network different from the first wireless network;
a processor configured to:
send a first information item on the first wireless network interface indicating a first user action occurred on the wireless device to connect the wireless device to an access point;
receive a confirmation on the first wireless interface from the access point in response to sending the first information item;
send a second information item on the second wireless interface, the second information item indicating a second user action complementing the first user action to connect the wireless device to the access point, the second information item comprising an identifier uniquely identifying a radio equipment of the access point; and
establish a secure wireless connection with the access point on the first wireless network in case a positive confirmation is received from the access point after sending the first information item, wherein
the access point is a virtualized access point comprising the radio equipment connected to a radio equipment controller through a wired network connection, and
the positive confirmation is generated by the radio equipment controller on condition that the first and second information items were received by the radio equipment controller in a time interval shorter than a value.

8. A radio equipment controller device of an access point comprising:
a wired network interface for providing a wired network connection to a radio equipment device of the access point;
a processor configured to:
receive a first information item from a first device through the radio equipment device, the first information item being representative of a first user action occurring on the first device seeking to connect to the access point, the first information item being encapsulated in the wired network connection;
receive a second information item from a second device, the second information item indicating a second user action complementing the first user action to connect the first device to the access point,
wherein the first and the second information items are respectively received from the first and the second devices via respectively a first and a second wireless networks, the second wireless network being different from the first wireless network; and
establish a secure wireless connection of the first device to the access point based on the received first and second information items, the secure wireless connection being established on condition that the first and second information items are received in a time interval shorter than a value.

9. A virtualized access point comprising the radio equipment controller device of claim 8, and the radio equipment device connected to the radio equipment controller device through the wired network connection, wherein the radio equipment device comprises:
a RF front end configured to generate a first sampled baseband signal from a first RF signal received by an antenna; and
a wired network interface configured to transmit the first sampled baseband signal to the radio equipment controller device, the wired network interface being further configured to receive a second sampled baseband signal from the radio equipment controller device, the RF front end being further configured to transmit through the antenna a second RF signal corresponding to the received second sampled baseband signal.

10. The virtualized access point according to claim 9, wherein the radio equipment device further comprises:
a signal detector configured to detect a signal responsive to the second user action; and
a processor configured to transmit an information item on the wired network interface in addition to the first sampled baseband signal, in case the signal is detected, the information item indicating an occurrence of the second user action on the access point.

11. A non-transitory computer readable storage medium comprising program code instructions executable by a processor for executing the method according to claim 1.

12. The radio equipment controller device according to claim 8, wherein the second information item is associated with the radio equipment device.

13. The radio equipment controller device according to claim 8, wherein the wired network connection is a Common Public Radio Interface (CPRI).

14. The radio equipment controller device according to claim 8, wherein the processor is further configured to establish the secure wireless connection by applying a security protocol belonging to a set at least comprising a Wi-Fi protected setup protocol and a Bluetooth Secure Simple Pairing protocol.

* * * * *